United States Patent [19]

Jüntgen et al.

[11] 4,432,774

[45] Feb. 21, 1984

[54] ADSORPTION-DESORPTION PROCESS FOR THE RECOVERY OF HYDROGEN

[75] Inventors: Harald Jüntgen; Karl Knoblauch; Jürgen Reichenberger; Hans-Jürgen Schröter, all of Essen, Fed. Rep. of Germany

[73] Assignee: Bergwerksverband GmbH, Essen, Fed. Rep. of Germany

[21] Appl. No.: 93,616

[22] Filed: Nov. 9, 1979

Related U.S. Application Data

[63] Continuation of Ser. No. 922,422, Jun. 30, 1978, abandoned.

[30] Foreign Application Priority Data

Jun. 30, 1977 [DE] Fed. Rep. of Germany ....... 2729558

[51] Int. Cl.$^3$ ............................................. B01D 53/04
[52] U.S. Cl. ............................................ 55/25; 55/58; 55/68
[58] Field of Search ................... 55/25, 58, 62, 68, 73, 55/74, 75

[56] References Cited

U.S. PATENT DOCUMENTS

| | | | |
|---|---|---|---|
| 2,340,398 | 2/1944 | MacMullin | 55/58 |
| 2,918,140 | 12/1959 | Brooks | 55/58 |
| 3,150,942 | 9/1964 | Vasan | 55/62 X |
| 3,221,476 | 12/1965 | Meyer | 55/68 X |
| 3,225,516 | 12/1965 | Smith et al. | 55/25 |
| 3,237,379 | 3/1966 | Kant et al. | 55/58 |
| 3,252,268 | 5/1966 | Stark | 55/25 |
| 3,719,025 | 3/1973 | Heinze et al. | 55/58 X |
| 3,720,042 | 3/1973 | Simonet | 55/25 |
| 3,923,477 | 12/1975 | Armond et al. | 55/25 |
| 3,957,463 | 5/1976 | Drissel et al. | 55/58 X |

Primary Examiner—Robert H. Spitzer
Attorney, Agent, or Firm—Michael J. Striker

[57] ABSTRACT

An adsorption-desorption process for the recovery of hydrogen from a feed gas containing trace pollutants adapted to be strongly adsorbed, in concentrations generally below 1% by volume and containing components adapted for only light adsorption, in concentrations above 1% by volume is operated through a preliminary first adsorption stage for the strongly adsorbable trace pollutants and a second main adsorption stage for the light adsorbable components and for the discharge of hydrogen. Contrary to the prior art where the adsorption-desorption was effected by alternating high pressure and low pressure cycles in the main adsorption stage only, the pressure cycles in the present case are carried out both in the preliminary first adsorption stage and in the second main adsorption stage, preferably by arranging the two adsorption states in series. The process substantially extends the service time of the adsorber used in the first adsorption stage.

8 Claims, 4 Drawing Figures

ADSORPTION-DESORPTION PROCESS FOR THE RECOVERY OF HYDROGEN

This is a continuation of application Ser. No. 922,422, filed June 30, 1978, now abandoned.

BACKGROUND OF THE INVENTION

The invention relates to an adsorption-desorption process for the recovery of hydrogen from a feed gas that, in addition to the hydrogen, contains trace pollutants which are adapted to be strongly adsorbed in concentrations generally below 1% by volume and contains components which are adapted for only light adsorption in concentrations above 1% by volume.

Hydrogen containing feed gases occur among others in procedures such as the coke production, the coal gasification and the oil distillation. They are used in increasing amounts for the recovery of hydrogen. For this purpose preferably adsorbents are used which adsorb normally all gases except the hydrogen from the hydrogen containing feed gas. The hydrogen itself which is not adsorbed leaves the adsorber containing vessel, generally called the adsorber, at a comparatively high degree of purity. In these feed gases there are trace pollutants which are adapted for strong adsorption and comprise among others higher hydrocarbons, $NO_x$ (x indicating the different nitrogenous oxides), $H_2S$, $COS$, mercaptans, $NH_3$ and steam. The components which are adapted for less strong or only faint adsorption may be constituted by gases such as $N_2$, $CO$, $CO_2$, $CH_4$, $C_2H_6$, etc.

The components suited for only light adsorption can usually be easily desorbed while components which are adapted to be strongly adsorbed are desorbed only with certain difficulties.

As adsorbents there may be mentioned among others activated carbon, zeolithes, silicagel, aluminum hydroxide gel and carbon molecular sieves.

The adsorption capacity of any adsorbent at some point is exhausted. That is, it is completely contaminated by the adsorbed materials. However, since a disposal of the completely contaminated adsorbent is usually too costly, the adsorbent is from time to time subjected to a purification process to remove the adsorbed materials. This is called the desorption procedure.

Desorption is most easily carried out by isothermic pressure reduction, that is pressure release and/or evacuation or by rinsing (reduction of partial pressure). The rinsing can also be used in addition to the general pressure reduction. These procedures, however, result in the desorption only of the gases which are lightly adsorbed. The case is different with the strongly adsorbed gases which, because of their low concentration in the feed gases involved, will be called trace pollutants. These trace pollutants can be desorbed only by a temperature increase and/or steam rinse to a certain extent. If they are subject to decay in the pore system of the adsorbent because of a catalytic effect or if they react chemically (cracking, polymerization), they must be removed by a chemical reaction with a partially gasifying medium for instance steam or $CO_2$ at temperatures of usually above 970 K. This removal procedure for the trace pollutants in the following will be designated "regeneration" of the adsorbent as distinguished from the clear out desorption by pressure reduction and/or partial pressure reduction and temperature increase.

Presently, there are frequently used two-stage adsorption processes for the recovery of hydrogen from hydrogen containing feed gases. In a first adsorption stage, the preliminary purification stage, the gases which are adapted for strong adsorption are adsorbed, while in a second adsorption stage, the main purification stage, apart from hydrogen, all other gases which are adapted for light adsorption only are adsorbed. The hydrogen itself is discharged from the second adsorber at a more or less high purity, usually at a purity above 99% by volume.

Generally, the crude or feed gas flows continuously through the preliminary purification stage under constant operating conditions and in this course of the stage is gradually saturated with highly adsorbable gases.

In other words, the adsorbent is gradually contaminated. After a certain time when the adsorbent has reached the state of substantially complete contamination it is, depending on the kind of deposition in the pore walls, heated or rinsed with steam at temperatures between 370 K. and 570 K. or reactivated at temperatures above 970 K. with a partially gasifying medium such as steam or $CO_2$. For the latter process the adsorbent is removed from the adsorber. Occassionally regeneration is completely dispensed with for cost reasons and the contaminated adsorbent is simply replaced by new material.

After leaving the preliminary purification stage the mixture enters a second adsorption stage in which the hydrogen is separated from the remaining gases which are of the type adapted for light adsorption only. This is accomplished by passing the pre-purified gas mixture, usually under elevated pressure, through the adsorbent so that all components except the hydrogen are adsorbed and the hydrogen is discharged at a more or less high purity as the so-called product gas.

The desorption is effected alternately with the adsorption by pressure reduction or reduction of partial pressure when the adsorption capacity of the adsorbent has being reached for any of the gas components to be separated. This is called the breakthrough of this gas component.

The cycle periods of adsorption and regeneration in the preliminary purification stage usually are several days up to weeks. In the main purification stage the cycle times between adsorption and desorption are on the other hand in the range of a few minutes up to at most 1 or 1½ hours.

In view of the substantially more expensive and more laborious regeneration in the preliminary purification stage as compared with the principal purification stage, efforts have been made to obtain a longer total service time, that is time prior to necessary regeneration in the preliminary stage adsorber. An overly rapid contamination of the adsorbent in the preliminary purification stage actually can interfere with the economy of the entire adsorption procedure.

The service time depends generally on the composition of the crude or feed gas, the quality of the adsorbent and the pressure and temperature of the gases. However, even if all these factors are pesent in their optimum form the service times for the preliminary stage are still much too short.

The present invention, therefore, has the object of obtaining a longer service time for the adsorbent in the preliminary adsorption stage in which the trace pollutants which are adapted for strong adsorption are being adsorbed.

SUMMARY OF THE INVENTION

This object is met by subjecting the preliminary purification stage up to substantially complete contamination with the trace pollutants to the same pressure change cycle as the principal purification stage undergoes, and separating the preliminary purification stage from the main purification stage for purposes of regeneration only in case of substantially complete contamination.

According to a special embodiment of the invention the preliminary purification stage and the main purification stage are arranged in series during the pressure change cycles.

Through this procedure the gas mixtures which are subject to purification are passed into the preliminary purification stage and the main purification stage at approximately the same pressure. The gas mixture coming from the preliminary purification stage is passed into the main purification stage at the most direct route through a duct provided with an open valve. The hydrogen is then received at the other end of the principal adsorber at a purity which normally is above 99% by volume and in most cases even reaches 99.9% by volume. The pressure reduction is effected together for both purification stages through a single outlet opening for the gas. Therefore, further ducts and valve systems are not necessary in this case.

Surprisingly, by this kind of procedure, the adsorbent of the preliminary purification stage is contaminated considerably slower than in the prior art processes which do not provide for pressure change cycles for the preliminary stage. Presumably this was done because the pressure reduction alone does not result in a substantial desorption of the gases which are adapted for strong adsorption.

The regeneration of the adsorbent in the preliminary stage can be carried out in the process of the invention in very simple manner. It is only necessary to shut off the feed gas mixture and to close the valve in the connecting duct between the two adsorbers. The adsorbent in the preliminary adsorber can then be regenerated in conventional form and if desired after removal from the adsorber.

The size of the adsorber in the preliminary stage has considerable effect on the degree of efficiency of the adsorber. Too large an adsorber lowers the degree of efficiency; an adsorber which is too small requires a larger number of thermal regeneration cycles. In the layout of the apparatus for this process usually it is preferred to provide for a size ratio of the preliminary stage to the main stage between about 1:3 and 1:20.

According to another embodiment of the invention the gases which flow out of the adsorber upon pressure reduction are conducted in a direction contrary to the adsorption direction. Preferably, the two adsorbers are arranged in series, though even in case of a parallel arrangement the service time of the preliminary purification adsorber is considerably improved and the degree of purity of the hydrogen produced is increased.

It is also found that the pressure change cycles lead to a particularly effective use of the adsorbent in the preliminary and in the main purification stage if the pressures during the adsorption are higher or equal to 1 bar, preferably between 5 and 70 bar, while the desorption should be carried out at substantially lower pressures than used in the adsorption, preferably at a pressure between 1 and 0.01 bar.

It should be understood, though, that the preferred upper limit of the gas pressure during adsorption stated as 70 bar is not basic for the principal of the invention but is mentioned here only because it is about the highest pressure which is at present used with the crude gases involved. In the same manner it should be understood that the lowermost limit of the gas pressure during desorption which has been stated as 0.01 bar depends mostly on the technology of large vacuum pumps and on the economies of the entire procedure.

It is additionally preferred that in the preliminary stage an adsorbent is used which has relatively wide pores, preferably has a mean diameter of the pores between 0.6 and 2.0 nm, while in the principal stage an adsorbent should be used which has comparatively narrow pores, and preferably has a main diameter of the pores of below 0.6 nm.

It will furthermore be understood that instead of the regeneration of the substantially contaminated adsorbent in the preliminary purification stage it may also be advantageous to replace the adsorbent by fresh material. This will depend on the kind of contamination.

In order to operate the process as a continuous process for hydrogen recovery, it is furthermore preferred to use at least two adsorption-desorption groups, each consisting of a preliminary and a principal adsorption stage and the necessary ducts and valves. This will permit to use the two groups alternatingly for adsorption and desorption.

It has also been found that the prolongation of the service time for the adsorbent in the preliminary purification stage is particularly noticeable if as feed gas a coke oven gas is used which has not been subject to the so-called fine purification. This is a feed gas which has not yet passed through the final purification during the normal processing of the gas resulting from the coking process.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

PREFERRED EMBODIMENTS OF THE INVENTION

Figure 1B:
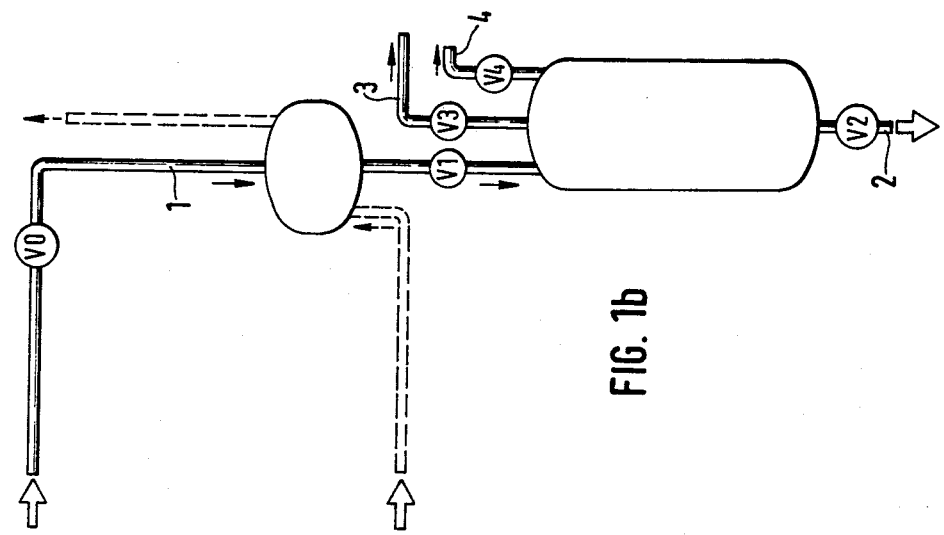
FIGS. 1a and 1b illustrate in diagrammatic form a two adsorber apparatus which in FIG. 1a is according to the present invention and according to FIG. 1b illustrates the state of the prior art.
Figure 1A:
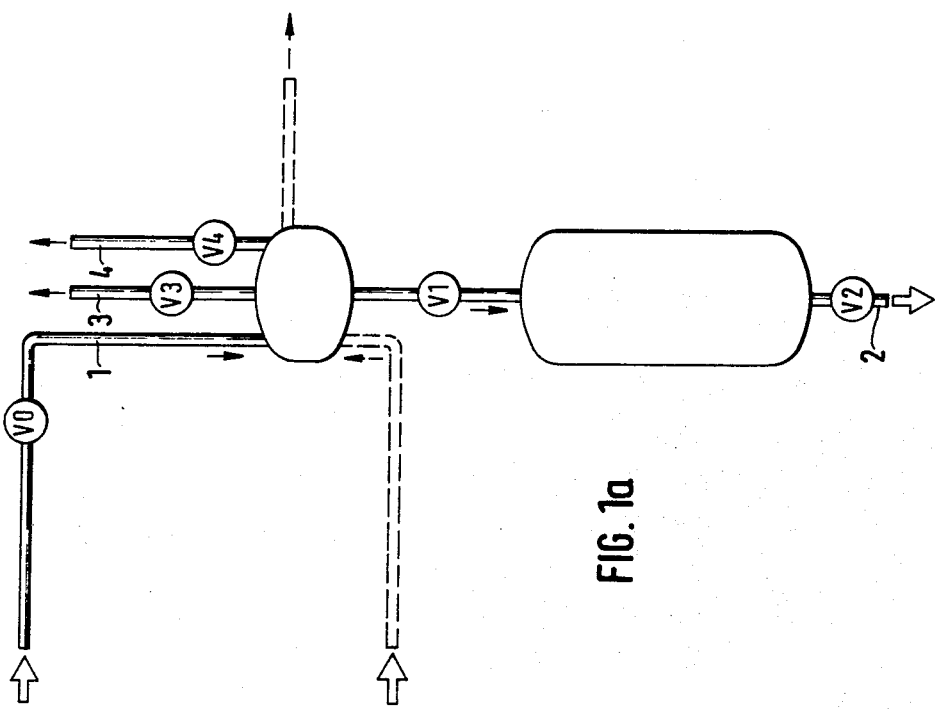
Figure 2:
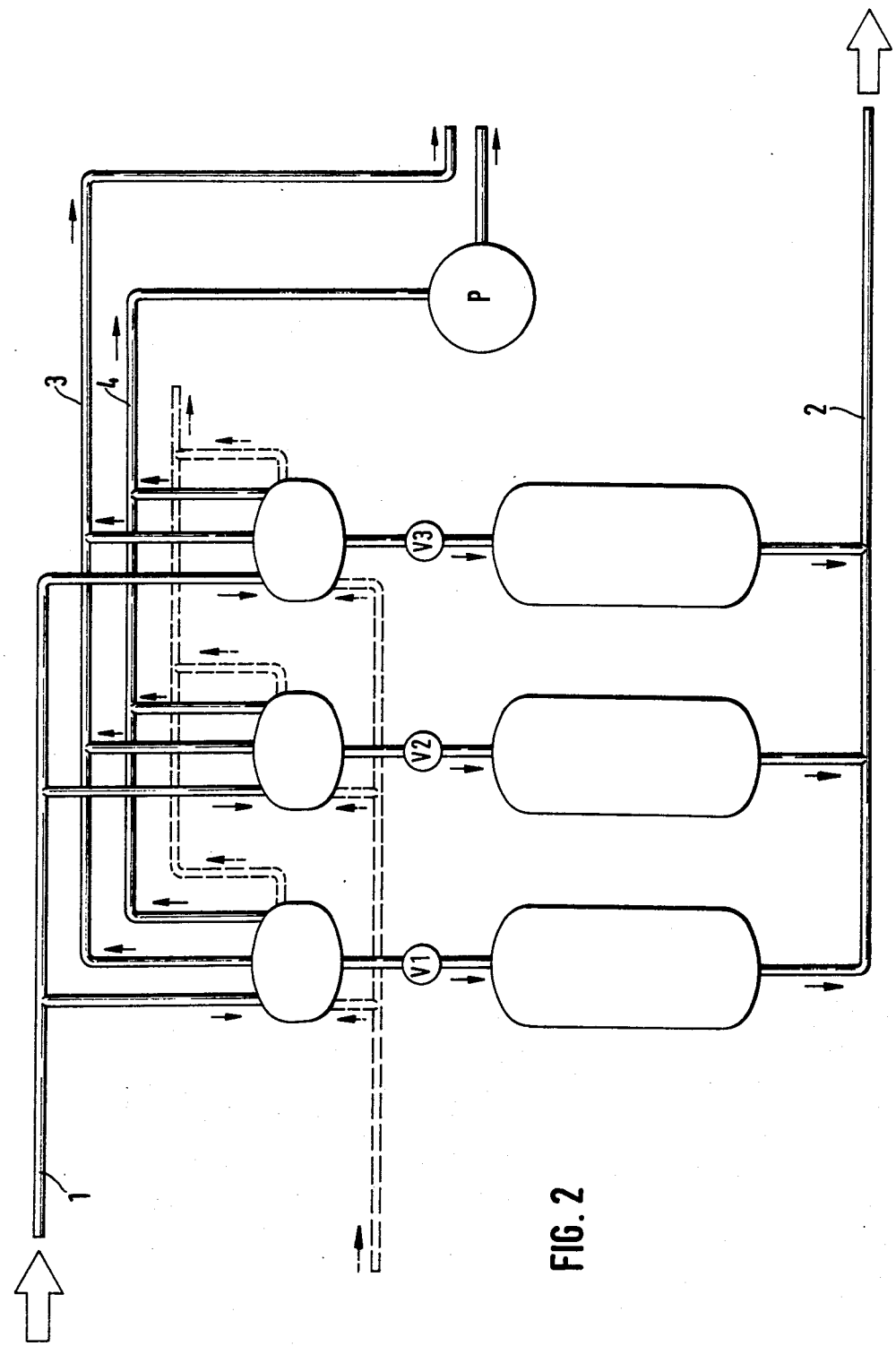
FIG. 2 illustrates a similar apparatus used for the process of the invention which in this case comprises three separate groups of adsorber units, each consisting of a preliminary adsorber and a principal adsorber.

As already indicated FIG. 1 illustrates the difference between the process of the invention (FIG. 1a) and the prior art process (FIG. 1b). In both Figures the same reference letters have been used to improve the understanding.

The feed gas is passed in either case through the duct 1 which is regulated by the valve VO. The feed gas passes into the preliminary purification stage adsorber VR. From there it passes through the valve V₁ after being purged of the highly adsorbable trace pollutants into the principal adsorber HR. Both adsorbers are filled with adsorbent.

At the outlet opening of the adsorber HR the hydrogen leaves the apparatus through the valve V₂ and duct 2.

The pressure reduction by pressure release is effected through a duct 3 and valve V₃, while evacuation is carried out through a duct 4 and valve V₄. During the pressure reduction all valves in the inlet and outlet ducts of both adsorbers are closed except that the intermediate valve V₁ and in case of pressure reduction the valve V₃ and in case of the evacuation the valve V₄ are open.

The gas mixture discharged through the ducts 3 and 4 is the loan gas which has a composition generally corresponding to that of the feed gas except for the hydrogen which has been recovered.

In addition to the pressure reduction and evacuation a rinse can be effected with a pure gas or fresh gas mixture. It is also possible during regeneration of the adsorber VR to close the valve V₁ and to feed a regeneration medium into the adsorber VR through the dashed line which medium will then be removed again after carrying out the regeneration.

Figure 3:
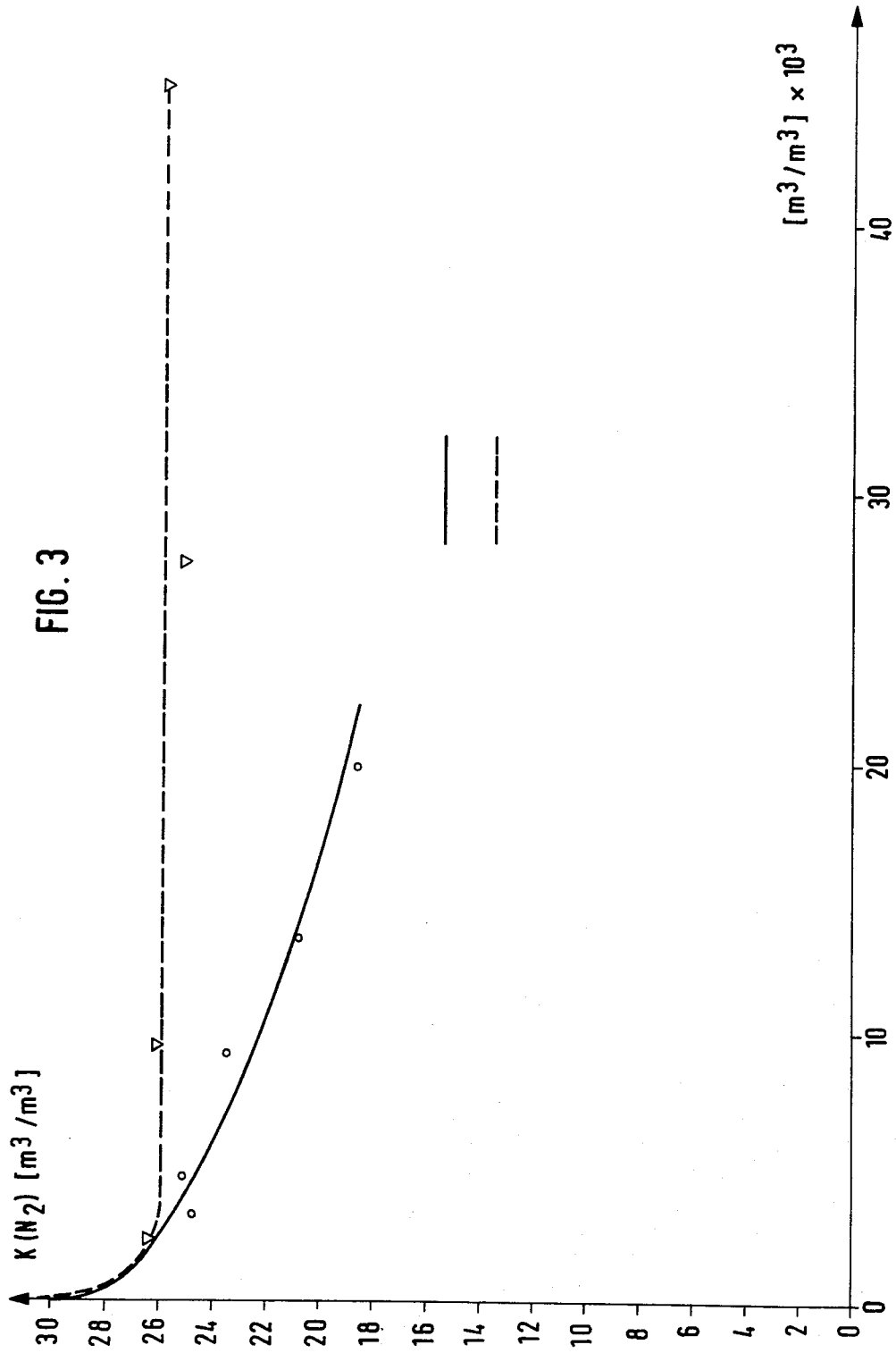
FIG. 3 is a graph which illustrates the service time of the adsorber in the preliminary purification stage with and without a pressure change. The graph shows the adsorption coefficient on the vertical axis against the gas throughput, that is the ratio of feed gas in cubic meters as per cubic meters of activated carbon on the horizontal axis.

In FIG. 3 an apparatus with three groups of adsorbers is shown. In this Figure some of the valves as shown in FIG. 1 have been omitted for clarity only. Otherwise the function of each individual group is the same as in FIG. 1 except that the different groups will be used alternatingly for adsorption and desorption.

In order to demonstrate the improvement of the service time for the adsorbent in the preliminary stage the following formulas have been developed and the following calculations have been carried out.

To establish these relations the adosrbers were filled with activated carbon and the feed gas was a crude gas such as coke oven gas which was passed into the apparatus at a constant pressure for an extended period of time, that is, without any pressure change. After specific amounts of crude gas expressed by the ratio of cubic meters of gas to cubic meters of activated carbon, had passed through the adsorber, the feed gas was shut off and the following test was carried out to establish the reduction of activity of the activated carbon due to the contamination with trace pollutants:

The activated carbon in the preliminary stage adsorber was first rinsed with hydrogen. Thereafter the coke oven gas or other test gas mixture was again passed into the apparatus. At the other end of the entire apparatus, that is at the other end of the principal adsorber, hydrogen was received until the next gas component, in this case the N₂, was received due to a breakthrough. This breakthrough occurs so much sooner as the activated carbon has been subject to higher contamination with trace pollutants. If the activated carbon is still substantially free of trace pollutants the N₂ breakthrough will occur comparatively late. As conventionally above from the breakthrough of the N₂ the following equation can be set up for the dynamic adsorption coefficient K of the test gas N₂:

$$K = \frac{t_D \cdot V}{M}$$

$t_D$ = N₂-break-through time (h)
V = discharged amount of H₂ (m³/h)
M = volume of the adsorbent (m³)

A high dynamic adsorption coefficient K for a particular gas component such as N₂ indicates a high adsorbability for this component. In the present case this shows that the activated carbon with a high K value regarding N₂ has not yet undergone any, or has undergone only a very minor contamination due to trace pollutants. Of course instead of N₂ any other test gas may be used.

The proof for the deposit of strongly adsorbable trace pollutants, which in addition may interreact chemically because of a catalytic effect of the adsorbent, is furnished in these cases indirectly through measuring the dynamic adsorption coefficient K for a lightly adsorbable component such as N₂. Direct methods of analysis are usually not practical since the trace elements because of their very low concentration cannot be measured with sufficient exactness.

The following examples will illustrate further a process for adsorption and desorption carried out in two stages by comparing the process of the invention (FIG. 1a) and the process of the prior art (FIG. 1b).

EXAMPLE 1

The two adsorbers were operated in series and were filled with activated carbon. The carbon was used in the first adsorber (VR) in an amount of 465 g while the amount in the second adsorber (HR) was 1832 g. As crude gas a coke oven gas was used of the following composition.

| CH₄ | N₂/CO | O₂ | CO₂ | higher hydrocarbons | H |
|---|---|---|---|---|---|
| 22.5 | 13.7 | 0.8 | 1.6 | 1.7 | 59.7 vol. % |

The gas was passed through the adsorbers in the direction shown at a pressure of 15 bar while the valves V₃ and V₄ were closed. This was continued until at the outlet end of the adsorber HR the first breakthrough of N₂ was noticed. Up to that point about 46 liters of coke oven gas had been introduced under normal conditions and 19 liter of hydrogen had been discharged at a concentration of 99.9% by volume. This concentration and also the breakthrough of the N₂ was determined by use of a mass spectrometer.

After the N₂ breakthrough occurred the desorption was effected by lowering the pressure (pressure reduction) and by evacuation (application of a vacuum) in the indicated directions.

The valves V₀ and V₂ (see FIG. 1) were closed during this step.

The composition of the desorption gas was as follows:

| CH₄ | N₂/CO | O₂ | CO₂ | higher hydrocarbons | H₂ |
|---|---|---|---|---|---|
| 42 | 19 | 1.9 | 1.8 | 4.0 | 31 vol. % |

Thereafter a new adsorption was effected resulting again in the discharge of hydrogen. This procedure was repeated by means of the conventional pressure change cycles which of course could be and were adjusted automatically. The total cycle time of adsorption and desorption in all these tests was between 5 and 25 minutes. The desorption pressure was between 0.01 and 0.1 bar.

In the first test series the pressure change was effected in both adsorbers illustrated in FIG. 1a. In the second test series the pressure change was effected only in the principal purification stage shown in FIG. 1b.

To determine the contamination of the adsorbent of the preliminary stage due to adsorption of trace pollutants the pressure change was interrupted at various times, for instance once a day, and the dynamic coefficient K for $N_2$ was determined for the adsorber of interest herein, that is the adsorber VR in the manner above described by means of a mass spectrometer.

The results obtained in these two test series are illustrated in the graph of FIG. 3. The full line indicates the tests where no pressure change was effected in the preliminary purification stage. The dashed line indicates the series with pressure change in that stage.

As appears the deterioration of the adsorber in the preliminary stage due to contamination with trace pollutants does not occur as fast in the series where pressure changes were effected also in the preliminary purification stage. This is different with the series applying to an apparatus and procedure where the preliminary stage is only passed through by the forward flowing gas.

It was found that the adsorber VR of the preliminary stage showed a clear decline of the dynamic adsorption coefficient only after a throughput feed gas amount of 350,000 $m^3/m^3$ activated carbon (FIG. 1a). This situation was reached only after 39 days.

It is noted that for better contrast and clarification the results in FIG. 3 cover only the range up to 40,000 $m^3$ of crude gas per $m^3$ of activated carbon.

It is also noticed that the first sharp drop in both curves (below 2000 $m^3$ of gas per $m^3$ of activated carbon) is due to the adsorption of steam which is present in coking gas. This phenomenon is almost always noticed and is of no significance for the invention.

After the adsorber of the preliminary purification stage had been substantially fully charged with trace pollutants a regeneration of this adsorber was effected in both cases. For this purpose the activated carbon of the preliminary stage was heated to a temperature of 1050 K after closing the valve $V_1$ and was rinsed with superheated steam for 10 minutes whereupon the adsorber VR was permitted to cool down.

A test again showed a K value for $N_2$ of 30.9 $m^3$ gas per $m^3$ of activated carbon which was the same value as the value at the initial start of the process. This showed that the apparatus now was available for a new run including new pressure change cycles.

EXAMPLE 2

The same test as described in Example 1 was carried out for an operation in which both purification stages were subjected to the same pressure change (FIG. 1a.) However, in this case in the preliminary stage an activated carbon was used of a wide pore size (mean adsorption pore diameter: 1.5 nm; bulk density: 370 kg/$m^3$). In the main adsorber (HR) the activated carbon had a relatively narrow pore size (mean adsorption pore diameter: 0.4 nm; bulk density: 690 kg/$m^3$). The tuffer type of carbon had been used in Example 1 in both adsorbers.

Contrary to the results in Example 1 the decline of the dynamic adsorption coefficient in the preliminary stage occurred only after 420,000 $m^3$ of throughput feed gas per $m^3$ activated carbon (as distinguished from 350,000 $m^3/m^3$ in FIG. 3).

This shows that the relatively wide pore activated carbon is particularly useful for removing the trace pollutants in the preliminary stage while a relatively narrow pore activated carbon is preferred in the main purification stage.

It is noted that in all tests described the feed gas throughput was related to $m^3$ of activated carbon used in the particular stage involved.

The drawing of FIG. 3 clearly shows the advantage of the present invention. It is mentioned in this connection that the same tests would show the same or similar results with any other crude gas.

In addition, the following is mentioned as a further advantage of the process of the invention. In the prior art process it is quite clearly only the size of the principal purification stage, that is of the adsorber HR which determines the amount of recovered hydrogen. However, in the process of the invention the preliminary stage (adsorber VR) participates in the pressure change cycles. As a result the amount of hydrogen in the earlier stages of the procedure where the preliminary stage is not yet greatly contaminated is determined by the size both of the preliminary adsorber and of the principal adsorber. Only with increasing contamination by trace elements does the activity of the preliminary stage decline. However, in actual practice the preliminary purification stage is usually not charged until complete contamination with trace elements occurs so as to less affect the principal purification stage. Therefore, throughout most of the proceeding a certain portion of the preliminary stage will still result in an increase of the amount of recovered hydrogen.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. In a process for the recovery of a purified gas from a feed gas mixture comprising passing the feed gas through successive interconnected adsorbent containing adsorbers and operating the adsorbers for successive adsorption and desorption, the feed gas containing, in addition to the desired gas, trace pollutants strongly adsorbed in concentrations generally below 1% by volume and components lightly adsorbed in concentrations above 1% by volume, said process employing a preliminary first adsorber for the strongly adsorbable trace pollutants and a main adsorber for the lightly adsorbable components, recovering the purified gas from the main adsorber, effecting the desorption by closing the outlet for the purified gas from the main adsorber and passing the gas through reversal of pressure by pressure reduction or evacuation from the main adsorber to the preliminary adsorber and causing the reversal of pressure jointly in said two adsorbers in the same cycle and subjecting said two adsorbers for the same periods of time to the same adsorption and desorption steps, the desorption gas being discharged exclusively from said preliminary adsorber, and shutting off said first adsorber from said main adsorber only after a number of several adsorption/desorption cycles, namely when the first adsorber has reached substantially complete contamination by said strongly adsorbable trace pollutants, whereupon said first adsorber is then subjected to a separate regeneration or replacement of the adsorbent.

2. The process of claim 1 wherein the size ratio of the preliminary adsorber to the main adsorber is between about 1:3 and 1:20.

3. The process of claim 1 wherein at least two groups of adsorption-desorption units are employed, each consisting of a preliminary adsorber and a main adsorber, the two groups being used alternately for adsorption and desorption and the units in each group being operated jointly as defined.

4. The process of claim 1 wherein the two adsorbers are directly connected by the shortest possible route for both adsorption and desorption.

5. The process of claim 1 wherein the adsorption is effected at pressures equal to or above 1 bar and the desorption is effected at a substantially lower pressure.

6. The process of claim 5 wherein the adsorption is effected at a pressure between 5 and 70 bar and the desorption is effected at a pressure between 1 and 0.01 bar.

7. The process of claim 1 wherein an adsorbent of relatively wide pore size is employed in the preliminary adsorber and an adsorbent with relatively narrow pore size is employed in the main adsorber.

8. The process of claim 7 wherein the adsorbent employed in the preliminary adsorber has a mean adsorption pore diameter of 0.6 to 2.0 nm and the adsorbent employed in the main adsorber has a mean adsorption pore size of below 0.6 nm.

* * * * *